United States Patent [19]
Boyadjieff et al.

[11] Patent Number: 5,451,129
[45] Date of Patent: Sep. 19, 1995

[54] PIPE TRANSFER SYSTEM

[75] Inventors: George I. Boyadjieff, Anaheim; James D. Brugman, Yorba Linda; Preston R. Fox, Fountain Valley, all of Calif.

[73] Assignee: Varco International, Inc., Orange, Calif.

[21] Appl. No.: 130,887

[22] Filed: Oct. 4, 1993

[51] Int. Cl.⁶ .......................................... E21B 19/06
[52] U.S. Cl. ........................ 414/22.61; 414/22.62; 414/738
[58] Field of Search ............... 414/746.7, 738, 737, 414/728, 22.54, 22.61, 22.62, 22.51, 22.52, 23, 731, 22.55–22.60; 175/85

[56] References Cited

U.S. PATENT DOCUMENTS

| | | | |
|---|---|---|---|
| 2,643,006 | 6/1953 | King | 414/22.52 |
| 3,002,560 | 10/1961 | Paget | 414/746.7 X |
| 3,204,795 | 9/1965 | Larson | 414/731 |
| 3,262,593 | 7/1966 | Hainer. | |
| 3,591,025 | 7/1971 | Perrott | 414/731 |
| 3,695,467 | 10/1972 | Grundon | 414/731 |
| 3,792,783 | 2/1974 | Brown | 175/85 X |
| 4,040,524 | 8/1977 | Lamb et al. | 414/22.52 |
| 4,047,453 | 1/1978 | Moller | 175/85 X |
| 4,069,879 | 1/1978 | Brown | 175/85 X |
| 4,081,087 | 3/1978 | Freeman, Sr. | 414/22.52 |
| 4,082,193 | 4/1978 | Teague | 414/22.52 |
| 4,099,630 | 7/1978 | Beck | 414/22.52 |
| 4,129,221 | 12/1978 | Moller | 175/85 X |
| 4,347,028 | 8/1982 | Dugan | 414/226.1 |
| 4,371,302 | 2/1983 | Frias et al. | 414/22.61 |
| 4,379,676 | 4/1983 | Frias | 414/745.8 |
| 4,382,738 | 5/1983 | Frias | 414/22.61 |
| 4,403,898 | 9/1983 | Thompson | 414/22.58 |
| 4,451,194 | 5/1984 | Keats et al. | 414/731 |
| 4,832,552 | 5/1989 | Skelly | 414/22.52 X |
| 4,917,567 | 4/1990 | Renfro et al. | 414/731 |
| 5,219,265 | 6/1993 | Recker | 414/731 |
| 5,273,388 | 12/1993 | Willis et al. | 414/22.54 |
| 5,294,228 | 3/1994 | Willis et al. | 414/22.55 |

FOREIGN PATENT DOCUMENTS

| | | | |
|---|---|---|---|
| 129968 | 1/1985 | European Pat. Off. | 414/22.54 |
| 2139269 | 11/1984 | United Kingdom | 414/22.55 |
| 2264734 | 9/1993 | United Kingdom | 414/22.51 |
| 2264736 | 9/1993 | United Kingdom | 414/22.51 |

*Primary Examiner*—Karen B. Merritt
*Assistant Examiner*—Lesley D. Morris
*Attorney, Agent, or Firm*—William P. Green

[57] ABSTRACT

A pipe handling machine for moving well pipes arranged essentially horizontally and essentially parallel to one another on a deck, and including a carriage which may contain an operator's control cabin and is mounted by tracks for movement transversely of the pipes, with an arm projecting from the carriage and adapted to support a pipe from one of its ends as a cantilever, and with the arm being power actuable upwardly and downwardly to raise and lower a pipe and in its elevated position shift the pipe laterally with the carriage. The arm may deliver the pipe to or receive it from an inclined conveyor leading to the rig floor. Preferably, two such machines are provided for shifting pipes on two storage decks at different levels, and for delivering pipes to or from an intermediate conveyor system extending between the two decks.

41 Claims, 4 Drawing Sheets

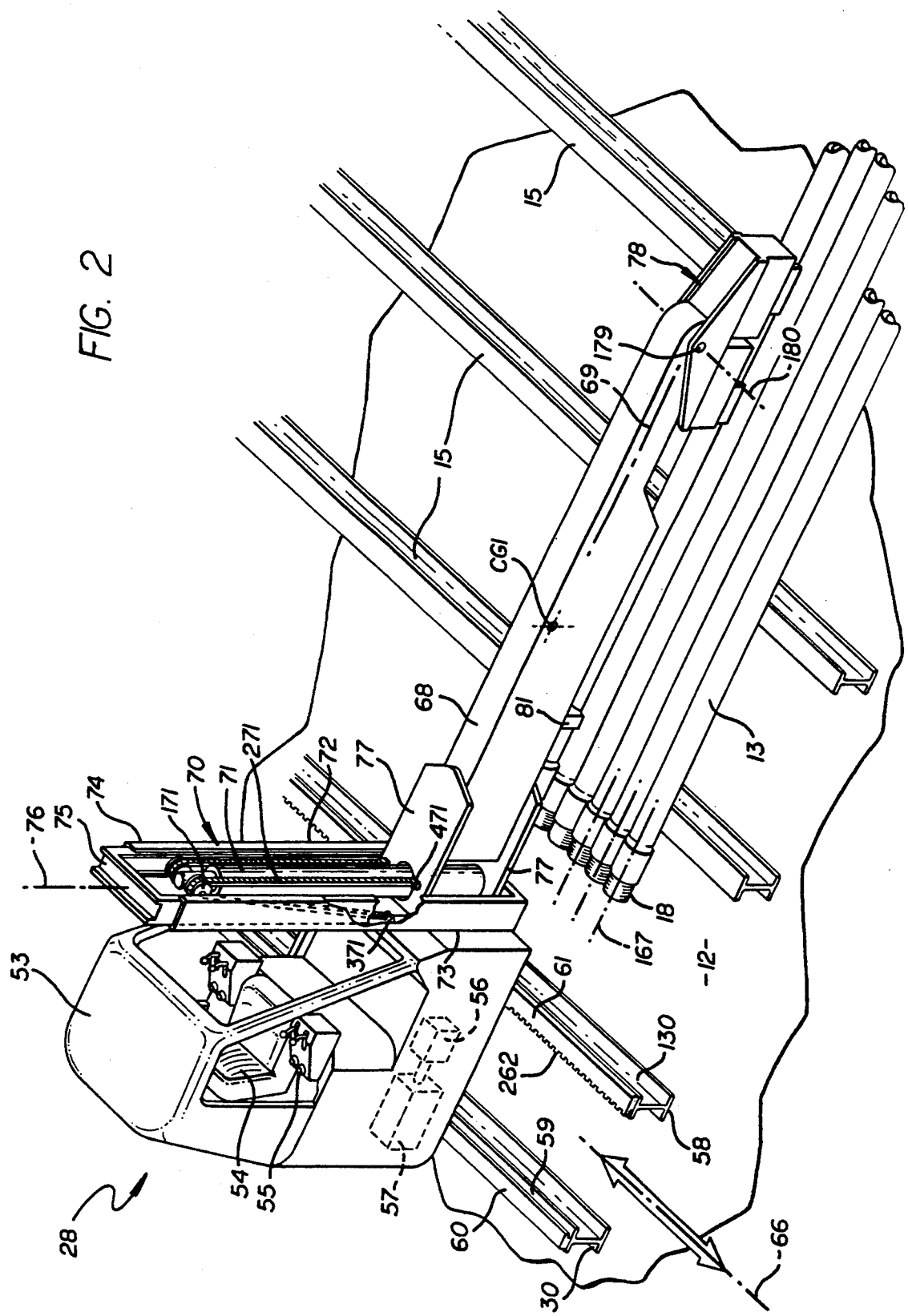

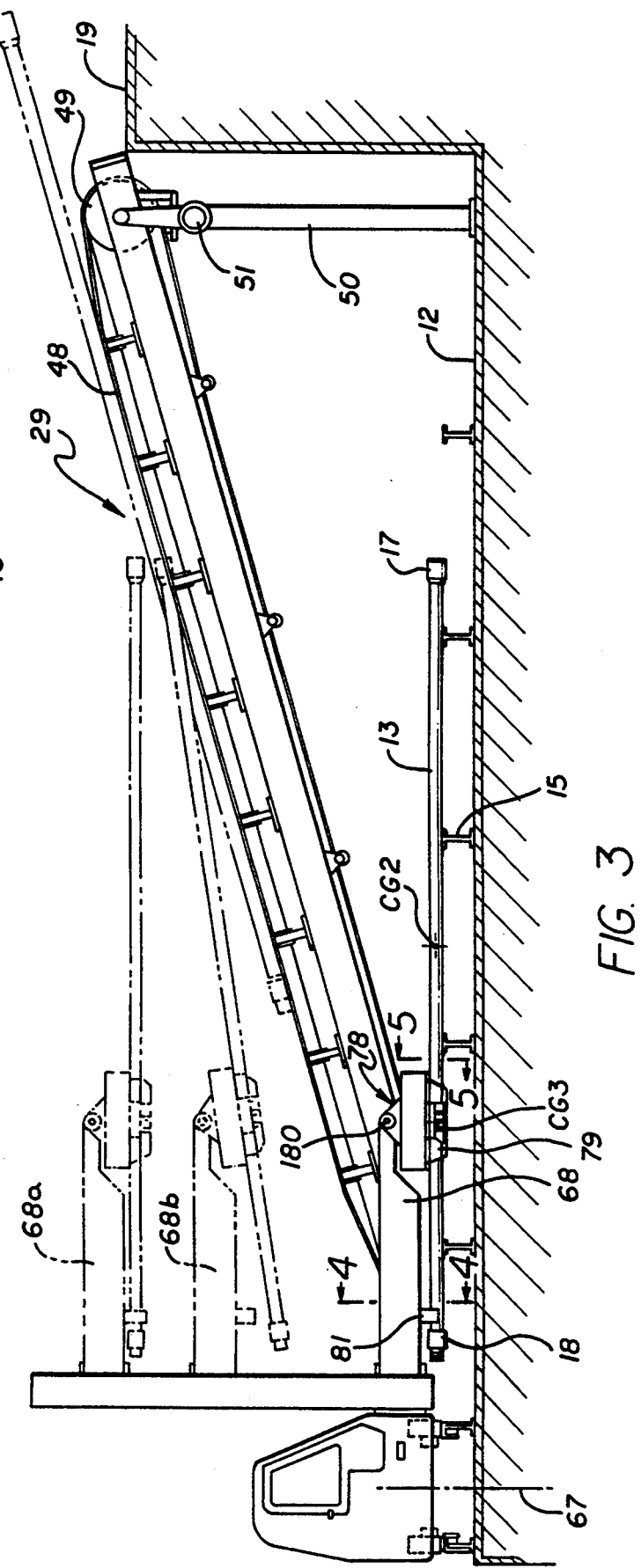
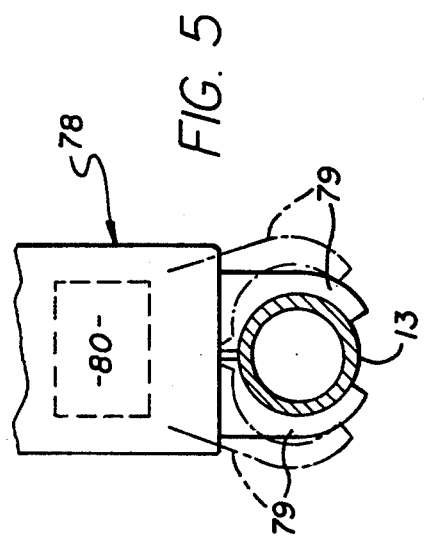
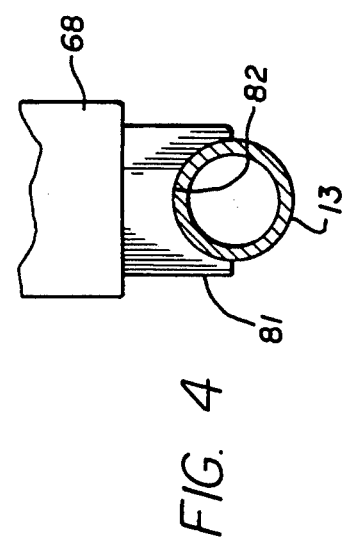

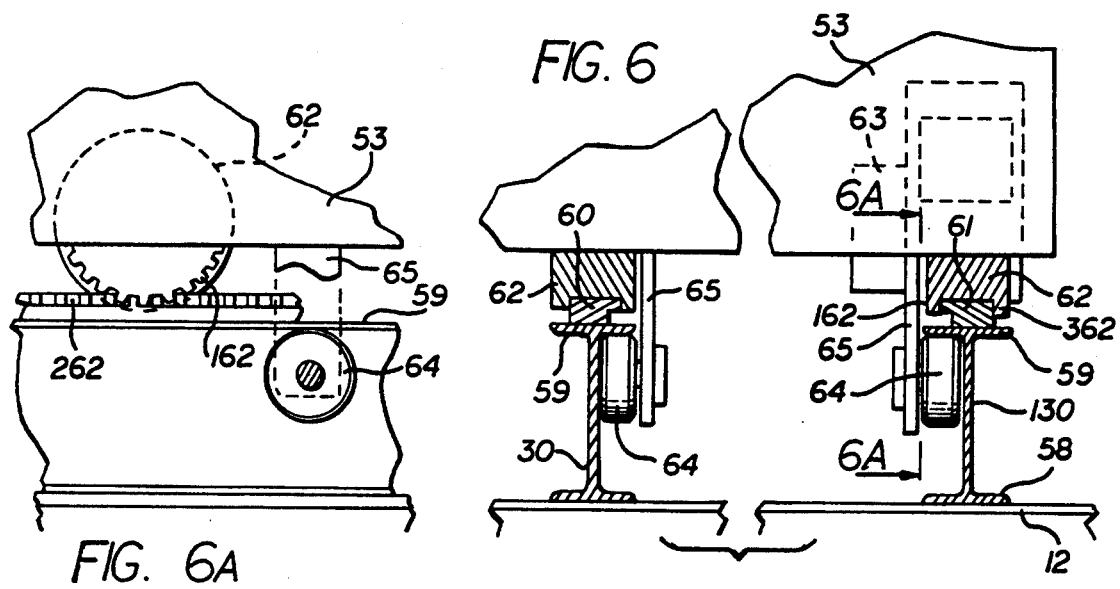
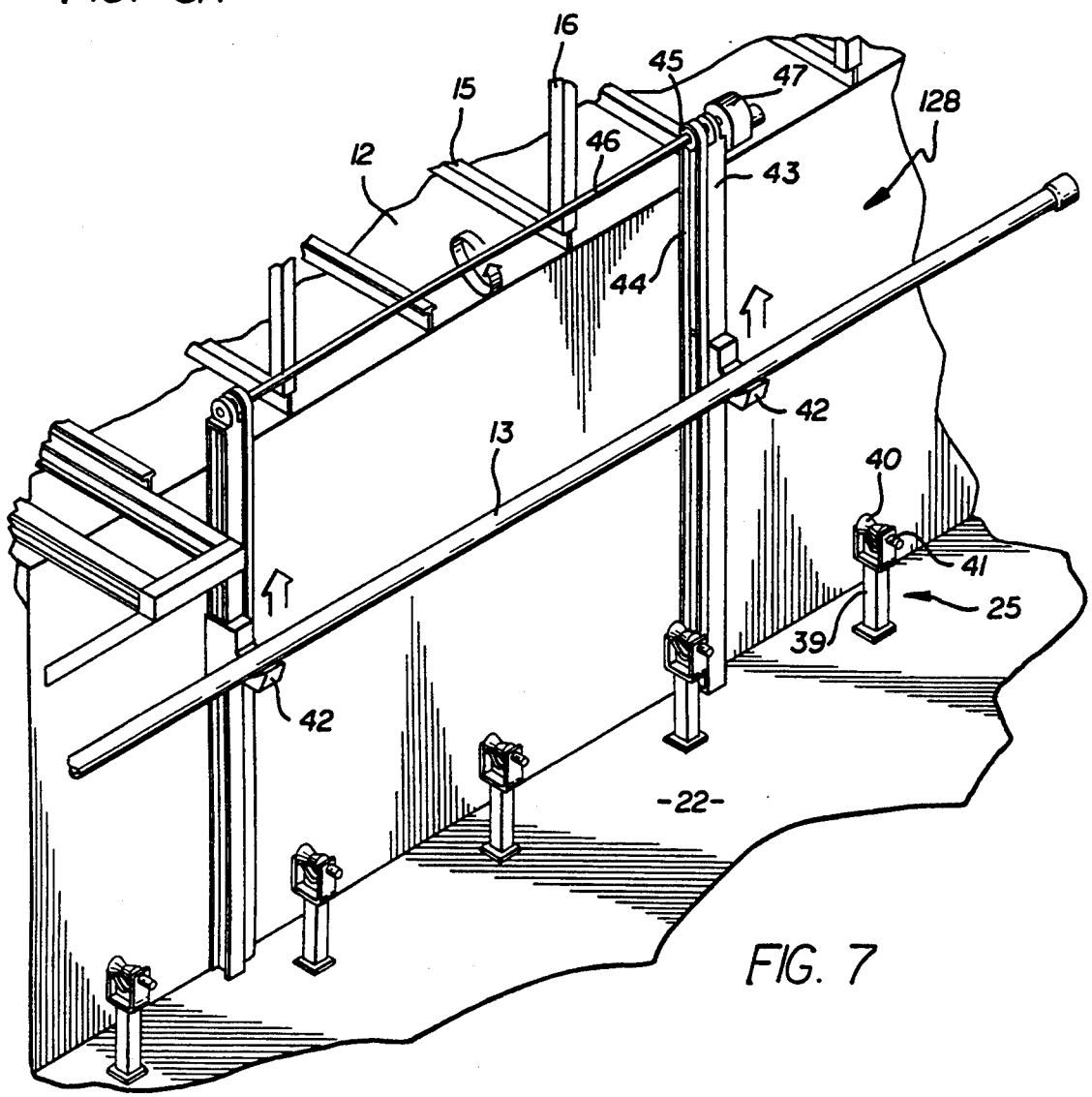

PIPE TRANSFER SYSTEM

This invention relates to improved apparatus for moving well pipe to and from a pipe storage deck adjacent a well drilling rig.

BACKGROUND OF THE INVENTION

It is conventional in drilling rigs to store pipe when not in use on a supporting deck near the derrick, with the pipes extending horizontally on the deck and parallel to one another. When one of the pipes is to be added to a string in the well, the pipe is usually lifted by a crane or other hoisting equipment from the horizontal storage position to a generally central position, and is then pulled upwardly along a V-door ramp to the drilling location using auxiliary hoisting equipment. When a length of pipe is removed from the string, it is lowered by the auxiliary hoisting equipment and the crane back to its horizontal position on the deck. These handling methods normally employed involve considerable manual manipulation of the pipes, with the expenditure of more rig time than would be desired in the handling process, and with substantial danger to the rig personnel. Inclined conveyors have been proposed for mechanically advancing a length of pipe upwardly from a storage deck to the drilling rig, or downwardly from the rig to the deck, but problems still remain in transporting the pipes between their horizontal storage positions and the conveyor, or between different horizontally extending positions on a storage deck or decks.

SUMMARY OF THE INVENTION

A major object of the present invention is to provide an improved pipe handling machine for moving well pipe sections between different positions on a storage deck or within a storage area, and between a horizontal position on such a deck and an inclined position on a conveyor by which the pipe is to be advanced to a drilling location. A machine embodying the invention can be installed on a standard rig very easily and rapidly, and without substantial alteration of the rig. The machine occupies a minimum amount of space, does not interfere with other operations performed on the rig, and structurally is very simple and inexpensive. In a rig equipped with a machine or machines constructed in accordance with the invention, a length of pipe can be moved entirely mechanically from one or more storage decks to an inclined conveyor, and then to the well axis, without any manual manipulation of the pipe by persons on the rig.

A machine embodying the invention includes a main body or carriage which preferably takes the form of an operator's cabin, and which desirably has an arm projecting from the body and adapted to support and lift a pipe in essentially a horizontally extending condition. The arm of the machine .engages and holds the horizontal pipe near one of its ends, as a cantilever, with the center of gravity of the pipe located well beyond the end of the arm, and with the arm itself also preferably being supported as a cantilever from the body of the machine, in a manner avoiding the complexities involved when lifting and moving a pipe with a conventional crane or hoist mechanism.

The operator's cabin or carriage is shiftable laterally of the pipes to move a supported horizontally extending pipe between different positions on a storage deck, or from a position on the deck to an inclined conveyor for advancing a pipe to the drilling location. The cabin may be mounted for such lateral movement by a track structure on the deck, with a motor being provided to power actuate the cabin to different positions along that track structure, and with the cantilever pipe support forces being transferred from the cabin to the track structure. A hoist assembly carried by the cabin raises and lowers the pipe support arm relative to the cabin, so that a pipe may be elevated above the deck by the machine, and then be shifted laterally to a different position on the deck, or to a position on a conveyor.

To enable the arm of the machine to lift a pipe in a horizontal condition, the arm may carry a lifting head adapted to apply an upward force to the pipe at a first location, and a stabilizing shoe for applying a downward force to the pipe at a second location nearer its end, in a manner effectively transmitting the cantilever support forces from the pipe to the arm. The lifting head may be a mechanical gripping unit or a magnetic device, and is preferably pivoted to the transporting arm of the machine to allow the supported pipe when moved into contact with an inclined conveyor to swing relative to the arm to a position of inclination corresponding to that of the conveyor. The pipe may then be released from the arm for advancement upwardly at an inclination by the conveyor.

In rigs which have two pipe storage decks, two machines of the above discussed type may be provided, with a first of the machines acting to shift pipe in horizontal condition between different positions on a first of the decks, and to a conveyor for advancing the pipe toward the-second-deck, and with-the second machine functioning to advance a pipe from the second deck to an inclined conveyor.

BRIEF DESCRIPTION OF THE DRAWINGS

The above and other features and objects of the invention will be better understood from the following detailed description of the typical embodiment illustrated in the accompanying drawings, in which:

FIG. 2 is an enlarged fragmentary perspective view of one of two pipe handling machines illustrated in FIG. 1;

FIG. 3 is a side view of one of the pipe handling machines, taken on line 3—3 of FIG. 1, and showing the arm of the machine in its lowermost position;

FIGS. 4 and 5 are fragmentary views taken on lines 4—4 and 5—5 respectively of FIG. 3;

FIG. 6 is an enlarged fragmentary view corresponding to a portion of FIG. 3, and illustrating the interengagement between the wheels of the operator's cabin and its supporting tracks;

FIG. 6A is a fragmentary vertical section taken on line 6A—6A of FIG. 6; and

FIG. 7 is a fragmentary perspective view of a portion of the pipe feed mechanism.

DESCRIPTION OF THE PREFERRED EMBODIMENT

Figure 1:
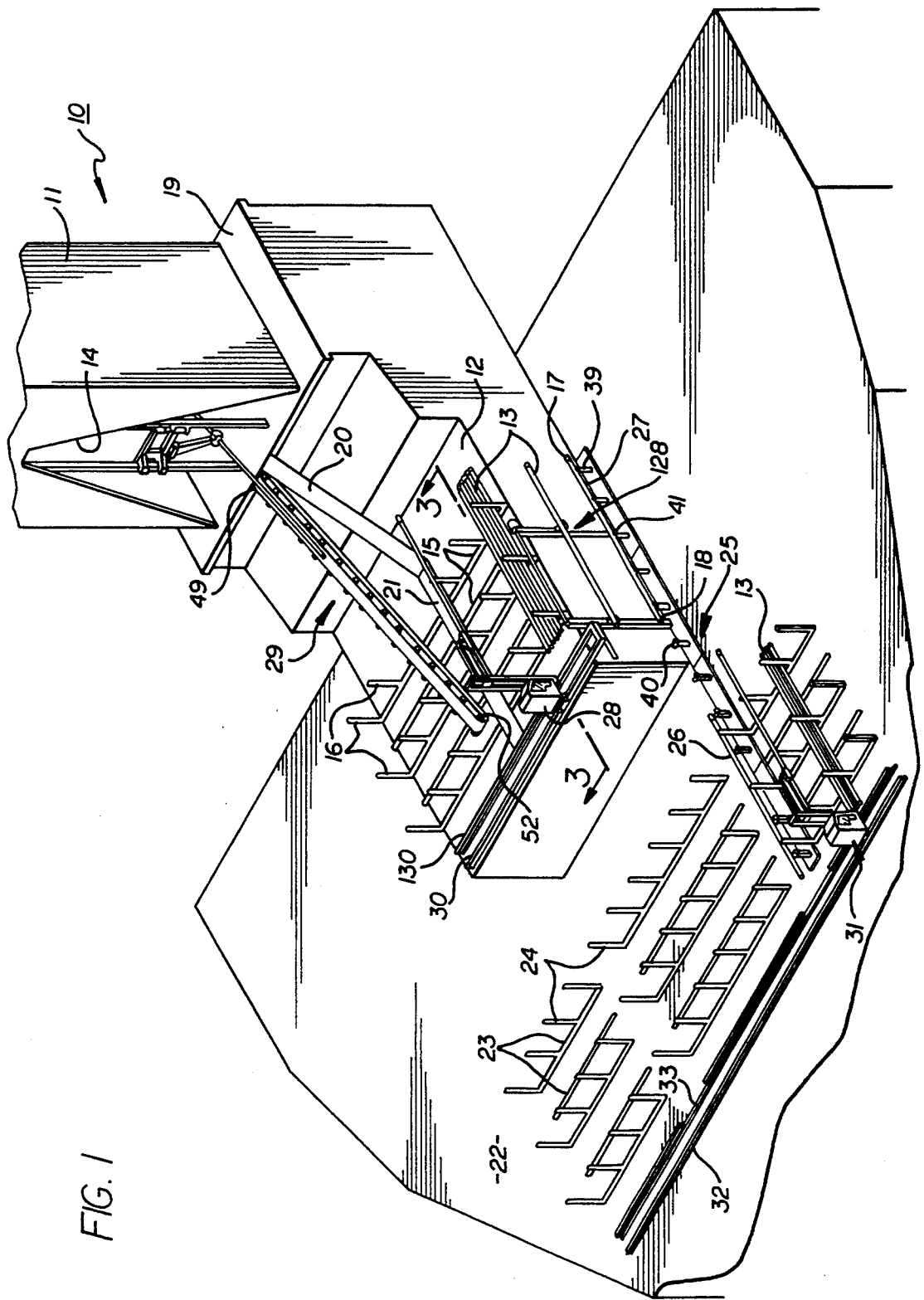
FIG. 1 is a perspective view representing a portion of a well drilling rig provided with pipe handling equipment embodying the invention.

The well drilling rig 10 fragmentarily illustrated in FIG. 1 includes the usual derrick represented at 11 containing suspension equipment for lowering a string of drill pipe downwardly into a well and apparatus for rotating the string to drill the well. Adjacent the derrick 11 is a horizontal pipe deck 12 on which pipes 13 are stored in parallel horizontally extending positions, to be delivered to the derrick as needed through a V-door 14 in the side of the derrick. Several parallel I-beams 15 project upwardly from deck 12, so that the pipes 13 may contact the upper flanges of these beams for support on the deck. Vertical posts 16 secured to and projecting uperwardly from beams 15 assist in holding pipes 13 in place on the deck. Each of the pipes 13 of course has the usual internally threaded box 17 at one of its ends and externally threaded pin 18 at its opposite end for connection to other similar pipe sections in forming the drill string.

In conventional well drilling operations, the pipe sections 13 are pulled upwardly by a crane or other means from the level of deck 12 to the higher level of the main rig floor 19 at the bottom of the derrick by movement along an inclined V-door ramp 20. In assisting such delivery of the drill pipe sections to the rig floor along ramp 20, rig hands may walk along a catwalk 21.

If the pipe deck 12 does not provide enough space for storage of all of the pipe sections which may be required for a well, an auxiliary horizontal pipe deck 22 may be provided at another still lower level, positioned as illustrated in FIG. 1. Pipe sections 13 may be supported on this deck by engagement with parallel I beams 23 attached to and projecting upwardly from the deck 22 and carrying upwardly projecting posts 24 for locating the pipe sections on the deck. Individual lengths of pipe can be fed longitudinally by a conveyor structure 25 from the location 26 of FIG. 1 on .deck 22 to a location 27. A lifting unit 128 may then raise an individual one of the pipes from the level of deck 22 to the higher level of deck 12, still in horizontal condition.

The pipes on deck 12 are moved vertically and horizontally relative to that deck by a pipe handling machine 28, which can deliver the pipes between any position on deck 12 and an inclined conveyor 29, or between any position on the deck and the lifting unit 128 at the side of deck 12. Machine 28 is movable laterally of deck 12 along two parallel tracks 30 and 130 secured to the deck. A second pipe handling machine 31 is similarly mounted on two tracks 32 and 33 attached to lower deck 22, and functions to move pipes between different positions on deck 22, and between any position on that deck and the longitudinal pipe advancement conveyor mechanism 25.

Conveyor 25 is typically illustrated as comprising a number of identical vertical posts 39 having rollers 40 at their upper ends for supporting a horizontally extending pipe and advancing the pipe longitudinally and horizontally between the locations 26 and 27 of FIG. 1 as the result of rotation of the rollers by individual motors 41.

The pipe lifting unit 128 includes two lifting claws 42 which are adapted to engage the underside of a pipe section supported on rollers 40 and lift the pipe section upwardly to the level of deck 12. Claws 42 are mounted by vertical guide structures 43 for upward and downward movement in unison, and are actuated vertically by hoisting chains 44 which at their upper ends engage sprocket wheels 45 on a shaft 46 driven by a motor 47 to shift lifting claws 42 either upwardly or downwardly for movement of a supported pipe either upwardly or downwardly between the levels of the two decks 12 and 22.

The inclined conveyor 29 includes an endless belt 48 formed of any convenient flexible material, with the belt at its upper end extending about a roller 49, which is mounted at the upper end of a support structure 50 and is driven by a motor 51 to cause endless movement of the belt, A second roller 52 mounts the lower end of the belt. Motor 51 can drive the belt in either direction, to move the upper run of the belt either upwardly to advance a supported pipe section from the level of deck 12 to the level of the rig floor 19, or downwardly to move a supported pipe section back down to the level of deck 12.

Referring now to FIG. 2, the pipe deck machine 28 includes a main body or carriage 53 which preferably takes the form of a cabin for containing an operator who controls the manipulation of the pipes 13 by machine 28. A seat 54 for the operator may be provided in the cabin, with controls 55 in the cabin accessible to the operator. To render the machine as self contained as possible, all of its operations may be effected hydraulically, by fluid pressurized by a hydraulic power unit 56 driven by an internal combustion engine 57, all carried by and movable with cabin 53, The two tracks 30 and 130 which movably support the machine 28 may take the form of parallel I-beams having their lower flanges 58 welded, bolted, or otherwise rigidly attached to the upper horizontal surface of pipe deck 12. The upper horizontal flanges 59 of the two tracks rigidly carry two rail elements 60 and 61 which are welded or otherwise attached to the I-beams, and whose upper surfaces lie in a common horizontal plane for engagement with two pairs of wheels 62 mounted rotatably to the underside of the operator's cabin 53, to support the cabin for lateral movement longitudinally of tracks 30 and 130. Each of the wheels 62 has flanges 362 at opposite sides of the engaged track to retain the wheels on the tracks. One or more of the wheels 62 is driven in either direction by a hydraulic motor 63 carried by cabin 53 and supplied with pressurized hydraulic fluid from unit 56 under the control of the control mechanism 55 in the cabin. One of the flanges 362 of each of the power driven wheels may have an annular series of teeth 162 engaging a series of rack teeth 262 on the corresponding rail element 61 to function as a gear driving the cabin along the tracks.

Additional rollers 64 are mounted rotatably to plates 65 projecting downwardly from the framework of cabin 53, to engage the undersides of the upper flanges 59 of I-beams 30 and 130 and resist upward movement of the cabin relative to either of the tracks 30 or 130. The cabin is thus effectively confined for only horizontal movement along a horizontal axis represented at 66 in the figures. The vertical plane 67 containing axis 66 is perpendicular to the longitudinal axes 167 of the well pipe sections 13 on deck 12. It is also noted that the tracks 30 and 130 and cabin 53 are all located leftwardly beyond the left ends 18 of pipes 13 as viewed in FIG. 3.

Projecting rightwardly from cabin 53 as viewed in FIGS. 2 and 3, the pipe handling machine includes an elongated rigid pipe handling arm 68 which extends above the left hand portions of pipes 13, and is adapted to engage a pipe section from its upper side and lift it vertically while the pipe section remains in horizontal position. The longitudinal axis 69 of arm 68 is parallel to the longitudinal axes of the pipes 13 on deck 12, and is perpendicular to the vertical plane 67 defining the direction of horizontal shifting movement of cabin 53. Arm 68 is actuated upwardly and downwardly by a hoist assembly 70 including a vertically extending piston and cylinder mechanism 71, whose cylinder is rigidly attached to a vertically extending frame structure 72 rigidly attached to cabin 53 at 73. Frame 72 includes two parallel vertical channel shaped members 74 forming a guideway receiving an inverted U-shaped inner frame 75 and guiding that frame 75 for upward and downward movement along a vertical axis 76 relative to frame 72 and cabin 53. Arm 68 is rigidly attached to the vertically movable frame structure 75, for movement upwardly and downwardly therewith. The attachment between arm 68 and frame 75 may be made by two horizontal upper and lower plates 77 welded to the left end of arm 68 and to lower portions of frame 75. The piston of mechanism 71 actuates frame 75 and arm 68 upwardly and downwardly in accordance with the supply of pressure fluid to mechanism 71 under the control of the operator in cabin 53. To effect such actuation, the upper end of the piston may carry two sprocket wheels 171 engaging two chains 271, each of which extends downwardly from the sprocket wheel and is connected at a first end 371 to the framework of cabin 53 and at a second end 471 to one of the plates 77 attached to arm 68.

At its right end as viewed in FIGS. 2 and 3, arm 68 carries a lifting head 78, which is adapted to engage one of the pipes and apply upward force thereto. This lifting head 78 may have gripping jaws 79 as represented in FIG. 5 which are hydraulically actuated by an operating unit 80 in the head between the full line gripping positions of FIG. 5 and the broken line open positions of that figure. Alternatively, lifting head 78 may be an electromagnet adapted to exert upward force on the pipe when electrically energized, or may be any other type of device capable of lifting the weight of a pipe section. The lifting head 78 is attached to the end of arm 68 by a pivotal connection 1.79, allowing limited pivotal movement of head 78 and a supported pipe 13 about a horizontal axis 180 parallel to axis 66 and plane 67, and lying in a vertical plane perpendicular to the axes 167 of the pipe sections on deck 12.

Leftwardly of lifting head 78, and between that head and cabin 53, arm 68 carries a stabilizing shoe 81, which applies downward force to a supported pipe 13 at a location nearer to its left end 18 than the area of engagement between the lifting head 78 and the pipe. This stabilizing shoe 81 contains a recess 82 at its underside (FIG. 4) which may be curved circularly to receive and confine one of the pipe sections 13 while applying downward force to the pipe.

Arm 68 is supported from cabin 53 and its tracks 30 and 130 as a cantilever. The center of gravity of arm 68 is located to the right of cabin 53 and to the right of both of the cabin supporting tracks 30 and 130, and is typically represented at CGI in the figures. The center of gravity of a pipe section 13 when supported by arm 68 is represented at CG2 in FIG. 3, and is located rightwardly of the right end of arm 68 and rightwardly beyond the areas of engagement of both the lifting head 78 and stabilizing shoe 81 with the pipe. The pipe is thus supported by arm 68 as a cantilever, having its center of gravity rightwardly beyond the extremity of the arm; The combined structure defined by arm 68 and a pipe 13 supported thereby is also supported from cabin 53 and tracks 30 and 130 as a cantilever. The center of gravity of this combined structure consisting of the arm and pipe together is located well to the right of cabin 53 and both of its supporting tracks 30 and 130, and is typically represented at CG3 in FIG. 3. Because of the cantilever relationship between arm 68 and a supported pipe 13, the arm effectively maintains the pipe in horizontal position even though lifting head 78 and stabilizing shoe 81 both engage the pipe well to the left of its center of gravity. Thus, the pipe can be lifted from deck 12 in horizontal condition, and can be moved laterally in that horizontal condition to different positions on deck 12, and into and out of engagement with conveyor 29 or lifting unit 128. When a pipe is supported by arm 68, the wheels 62 of cabin 53 which engage the right hand track 130 of FIG. 6 bear downwardly against the rail element 61 of that track, while the wheels 64 which engage the underside of the left hand track 30 bear upwardly against upper flange 59 of that track, to transmit the cantilever support forces to tracks 30 and 130 and through those tracks to the structure of deck 12.

To now describe a cycle of operation of the pipe handling machine 28, assume that a length of pipe resting on beams 15 of deck 12 is to be transported from a position on that deck to derrick 11. The operator first actuates the controls 55 in cabin 53 to deliver pressurized hydraulic fluid from unit 56 to piston and cylinder mechanism 71 in a direction lowering arm 68 into engagement with one of the pipes on deck 12. He then energizes gripping head 78 to grip the pipe in supporting relation. The operator next reverses the drive to piston and cylinder mechanism 71, causing it to elevate frame 75 and arm 68 and thereby lift the engaged pipe while retaining it in horizontal position. As discussed, head 78 applies upward lifting force to the pipe while shoe 81 exerts downward force against the pipe near its left end to support the pipe as a cantilever from arm 68 and from the cabin and its supporting tracks 30 and 130. The arm 68 may be elevated in this manner to a position such as that represented in broken lines at 68a in FIG. 3, in which position the pipe 13 supported by the arm has its right end higher than a corresponding portion of belt 48 of inclined conveyor 29. With the arm and pipe in this elevated position, the operator actuates the controls to deliver power to hydraulic motor 63 for shifting cabin 53 and the arm 68 and carried pipe laterally along axis 66 to a position in which the pipe is directly above and in the same vertical plane as conveyor 29. The operator then reverses the delivery of hydraulic fluid to the piston and cylinder mechanism 71, to lower arm 68 in a manner bringing the right end of the supported pipe into engagement with the upper surface of belt 48. As the arm 68 is lowered further, as through the position represented at 68b in FIG. 3, the engagement of the right end of the supported pipe with the belt prevents further downward movement of that right end, causing pivotal movement of lifting head 78 and the pipe relative to arm 68 about axis 180, with this motion continuing until the pipe is disposed at the same inclination as the upper run of belt 48 and is supported thereby. The operator can then actuate the lifting head 78 to release the pipe, so that the pipe may be supported entirely by the inclined upper run of belt 48, and can be mechanically advanced upwardly by energizing motor 51 to advance the belt endlessly and feed the pipe through V door 14 to the drilling location on deck 19. After release of the pipe from arm 68, the operator can again raise arm 68 to the elevated position 68a, and then energize motor 63 to shift cabin 53 and the arm laterally of the conveyor and back to a position to pick up another pipe section from deck 13. The described method of operation, can of course be reversed to move a pipe section downwardly along inclined conveyor 29 from the drilling location, and to a position at which it can be picked up by arm 68, lifted from an inclined position on the conveyor to a horizontal position such as that represented at 68a, and then shifted laterally and lowered to any desired location on pipe deck 12. The machine 28 may also be shifted laterally to a side of the pipe deck 12, to receive a pipe held by lifting unit 128 in its elevated position, or to return a pipe to lifting unit 128 in that elevated position.

The second pipe handling unit 31 may be identical to the unit 28 described specifically above, to raise a pipe in horizontal position from any location on deck 22, or lower the pipe to such a position on deck 22, and to shift the pipe laterally between any positions relative to the deck by movement of the machine along tracks 32 and 33. Also, machine 31 can lower a pipe onto the horizontal advancement conveyor mechanism 25, for delivery thereby to unit 128, or can raise a pipe from that horizontal conveyor 29.

While a certain specific embodiment of the present invention has been disclosed as typical, the invention is of course not limited to this particular form, but rather is applicable broadly to all such variations as fall within the scope of the appended claims.

We claim:

1. Apparatus for moving pipes arranged essentially horizontally and essentially parallel to one another on a deck, comprising:
   an operator's cabin to be located near an end of said pipes;
   a track structure located beyond said end of the pipes and mounting the cabin for movement transversely of the pipes;
   an arm projecting from said cabin generally parallel to and above said pipes;
   a holding unit carried by said arm for releasably holding and exerting upward force against one of said pipes;
   stabilizing means carried by said arm at a location between said cabin and said holding unit and constructed to apply downward force to a pipe to coact with said unit in supporting the pipe as a cantilever;
   said stabilizing means containing a downwardly facing recess for partially receiving the pipe to locate it against lateral movement;
   a vertically extending guide structure carried by said cabin;
   a frame connected to the arm and mounted by said guide structure for upward and downward movement with the arm to raise a pipe from or lower it onto the deck;
   a hoist for actuating said frame and the arm upwardly and downwardly relative to said guide structure and the cabin;
   a motor carried by the cabin and operable to shift the cabin transversely of the pipes along the track structure; and
   control means carried by the cabin for controlling actuation of said holding unit and said hoist and said motor.

2. Apparatus as recited in claim 1, including an inclined conveyor for advancing a pipe along an inclined path toward a drilling location;
   said holding unit being mounted to said arm for pivotal movement enabling swinging movement of a supported pipe from a generally horizontal position to an inclined position for delivery to or from said inclined conveyor.

3. Apparatus as recited in claim 2, in which said track structure includes two tracks, said cabin having wheels engaging said tracks to support the cabin thereon, and means connected to the cabin and exerting upward force against one of the tracks to transmit cantilever support forces between the cabin and the tracks.

4. Apparatus as recited in claim 2, in which said track structure includes two tracks, said cabin having wheels engaging said tracks to support the cabin thereon, and at least one wheel connected to the cabin and exerting upward force against one of the tracks to transmit cantilever support forces between the cabin and the tracks.

5. Apparatus as recited in claim 1, in which said track structure includes two tracks, said cabin having wheels engaging said tracks to support the cabin thereon, and means connected to the cabin and exerting upward force against one of the tracks to transmit cantiliver support forces between the cabin and the tracks.

6. Apparatus for moving well pipes between two storage decks and a derrick, comprising:
   conveyor means for moving a pipe in a generally horizontal condition between said two decks;
   a first pipe handling machine mounted movably adjacent 7. Apparatus for moving pipes arranged essentially horizontally and essentially parallel to one another on a deck, comprising:
   a carriage to be mounted movably near an end of said pipes;
   a structure connected to said carriage for movement with the carriage and relative thereto and constructed to hold one of said pipes near one end thereof and support the pipe as a cantilever;
   elevating means for moving said structure and a pipe supported thereby as a cantilever upwardly and downwardly to raise the pipe from or lower i onto the deck;
   lateral shifting means for moving said carriage and said structure and said pipe supported thereby transversely of said pipes;
   said structure including a member actuatable upwardly and downwardly relative to the carriage by said elevating means, and a unit for holding said pipe mounted to said member for movement relative thereto with the pipe for displacement of the pipe between a generally horizontal position and an inclined position; and
   an inclined conveyor for receiving a pipe supported by said unit in said inclined position.

8. Apparatus for moving pipes arranged essentially horizontally and essentially parallel to one another on a deck, comprising:
   a carriage to be mounted movably near an end of said pipes;
   a structure connected to said carriage for movement with the carriage and relative thereto and constructed to hold one of said pipes near one end thereof and support the pipe as a cantilever;
   elevating means for moving said structure and a pipe supported thereby as a cantilever upwardly and downwardly to raise the pipe from or lower it onto the deck; and
   lateral shifting means for moving said carriage and said structure and said pipe supported thereby transversely of said pipes;
   said lateral shifting means including two tracks mounting said carriage for movement transversely of said pipes, means for applying downward force from said carriage to a first of said tracks, and means for applying upward force from said carriage to the second of said tracks to transmit cantilever support forces from the pipe and said structure through said carriage to the tracks.

9. Apparatus as recited in claim 8, in which said lateral shifting means include a toothed rack carried by one of said tracks, a motor connected to the carriage, and a gear driven by said motor and engaging said rack to power actuate said carriage transversely of the pipes and along said tracks.

10. Apparatus as recited in claim 8, in which said tracks are located beyond said end of the pipes and extend transversely of the pipes, and said carriage is movable transversely along the tracks beyond said end of said pipes.

11. Apparatus as recited in claim 8, in which said structure includes an arm to be received above said end of the pipe, and holding means for supporting the pipe at the underside of the arm.

12. Apparatus as recited in claim 8, in which said structure includes a member actuable upwardly and downwardly relative to the carriage by said elevating means, and a unit for holding said pipe mounted to said member for movement relative thereto with the pipe for displacement of the pipe between a generally horizontal position and an inclined position.

13. Apparatus as recited in claim 12, including an inclined conveyor for receiving a pipe supported by said unit in inclined position.

14. Apparatus as recited in claim 8, in which said structure includes an arm projecting from said carriage, a lifting unit on the arm for applying upward force to a pipe supported by the arm at a location spaced from said end of the pipe, and means on the arm for exerting downward force against the pipe at a location closer to said end thereof to coact with said lifting unit in giving the pipe cantilever support.

15. Apparatus as recited in claim 8, in which said structure includes an arm projecting from said carriage, a lifting unit on the arm for applying upward force to a pipe supported by the arm at a location spaced from said end of the pipe, and means on the arm for exerting downward force against the pipe at a location closer to said end thereof to coact with said lifting unit in giving the pipe cantilever support; said last mentioned means containing a downwardly facing recess for partially receiving and partially encircling the pipe to locate it against lateral movement.

16. Apparatus as recited in claim 8, in which said structure includes an arm projecting from said carriage, a lifting unit on the arm for applying upward force to a pipe supported by the arm at a location spaced from said end of the pipe, and means on the arm for exerting downward force against the pipe at a location closer to said end thereof to coact with said lifting unit in giving the pipe cantilever support; said lifting unit being connected to the arm for swinging movement relative thereto with the pipe for displacement of the pipe between a generally horizontal position and an inclined position.

17. Apparatus as recited in claim 16, including an inclined conveyor for receiving a pipe supported by said lifting unit in inclined position.

18. Apparatus as recited in claim 8, in which said carriage forms a cabin within which an operator can be received to move transversely with the carriage relative to said pipes.

19. Apparatus as recited in claim 8, including control means carried by said carriage for controlling movement of a pipe by said structure.

20. Apparatus for moving well pipes between two storage decks and a derrick, comprising:
conveyor means for moving a pipe in generally a horizontal condition between said two decks;
a first pipe handling machine mounted movably adjacent a series of generally horizontal pipes on a first of the decks and constructed to move a pipe in essentially a horizontal condition between said first deck and said conveyor means;
a second pipe handling machine mounted movably adjacent a series of generally horizontal pipes on the second deck and constructed to move a pipe between said conveyor means and said second deck; and
additional conveyor means positioned to receive a pipe from said second machine in an inclined position and advance said pipe along an inclined path to or from the derrick;
said first mentioned conveyor means including a first conveyor operable to advance a pipe longitudinally and horizontally between locations adjacent the two decks, and a second conveyor operable to move a pipe vertically in essentially a horizontal condition between said first conveyor and said second deck.

21. Apparatus for moving Well pipes between two storage decks and a derrick, comprising:
conveyor means for moving a pipe in generally a horizontal condition between said two decks;
a first pipe handling machine mounted movably adjacent a series of generally horizontal pipes on a first of the decks and constructed to move a pipe in essentially a horizontal condition between said first deck and said conveyor means; and
a second pipe handling machine mounted movably adjacent a series of generally horizontal pipes on the second deck and constructed to move a pipe between said conveyor means and said second deck
said conveyor means including a first conveyor to advance a pipe longitudinally and horizontally between locations adjacent the two decks, and a second conveyor to move a pipe vertically in essentially a horizontal condition between said first conveyor and said second deck.

22. Apparatus for moving pipes arranged essentially horizontally and essentially parallel to one another on a deck, comprising:
a carriage to be mounted movably near an end of said pipes;
a structure connected to said carriage for movement with the carriage and relative thereto and constructed to hold one of said pipes near one end thereof and support the pipe as a cantilever;
elevating means for moving said structure and a pipe supported thereby as a cantilever upwardly and downwardly to raise the pipe from or lower it onto the deck;
lateral shifting means for moving said carriage and said structure and said pipe supported thereby transversely of said pipes;
said structure including an arm projecting from said carriage, a lifting unit on the arm for applying upward force to a pipe supported by the arm at a location spaced from said end of the pipe, and means on the arm for exerting downward force against the pipe at a location closer to said end thereof to coact with said lifting unit in giving the pipe cantilever support;

said lifting unit being connected to the arm for swinging movement relative thereto with the pipe for displacement of the pipe between a generally horizontal position and an inclined position; and an inclined conveyor for receiving a pipe supported by said lifting unit in said inclined position.

23. Apparatus for moving pipes arranged essentially horizontally and essentially parallel to one another on a deck, comprising:

a carriage to be mounted movably beyond one end of said pipes;

track means located at only said one end of the pipes and mounting said carriage for movement along the track means transversely of the pipes at said one end thereof;

a structure connected to said carriage for movement with the carriage along said track means and for movement relative to the carriage, and which is operable to hold one of the pipes near one end thereof and support said pipe as a cantilever;

elevating means for moving said structure and a pipe supported thereby as a cantilever upwardly and downwardly to raise the pipe from or lower it onto the deck; and means for moving said carriage and said structure and said pipe supported thereby along said track means transversely of the pipes.

24. Apparatus as recited in claim 23, in which said structure includes a member actuable upwardly and downwardly relative to the carriage by said elevating means, and a unit for holding said pipe mounted to said member for movement relative thereto with the pipe for displacement of the pipe between a generally horizontal position and an inclined position.

25. Apparatus for moving pipes arranged essentially horizontally and essentially parallel to one another on a deck, comprising:

a carriage to be mounted movably near an end of said pipes;

a structure connected to said carriage for movement with the carriage and relative thereto and constructed to hold one of said pipes near one end thereof and support the pipe as a cantilever;

elevating means for moving said structure and a pipe supported thereby as a cantilever upwardly and downwardly to raise the pipe from or lower it onto the deck;

lateral shifting means for moving said carriage and said structure and said pipe supported thereby transversely of said pipes;

said structure being constructed to permit movement of a pipe supported thereby from a generally horizontal position to an inclined position; and an inclined conveyor for receiving a pipe supported by said structure in inclined position and advancing the pipe along an inclined path.

26. Apparatus for moving pipes arranged essentially horizontally and essentially parallel to one another on a deck near a well, comprising:

a carriage to be mounted movably at essentially one end of said pipes;

track means located at only said one end of the pipes and extending transversely of the pipes and mounting said carriage for movement along the track means transversely of the pipes at said one end thereof;

an arm connected to said carriage for movement with the carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck; and means for moving said carriage and said arm and said pipe supported thereby along said track means transversely of the pipes.

27. Apparatus as recited in claim 26, in which said elevating means are operable to move said arm upwardly and downwardly relative to the carriage to raise and lower the pipe supported thereby.

28. Apparatus as recited in claim 26, in which said track means include two spaced parallel tracks extending transversely of said pipes beyond said end thereof.

29. Apparatus as recited in claim 26, in which said elevating means are operable to move said arm upwardly and downwardly relative to the carriage to raise and lower the pipe supported thereby, there being a unit for holding said pipe mounted to said arm for movement relative thereto with the pipe in a relation moving the pipe between a generally horizontal position and an inclined position.

30. Apparatus as recited in claim 26, in which said elevating means are operable to move said arm upwardly and downwardly relative to the carriage to raise and lower the pipe supported thereby, there being a lifting unit on the arm for applying upward force to a pipe supported by the arm at a location spaced from said end of the pipe, and means on the arm for exerting downward force against the pipe at a location closer to said end thereof to coact with said lifting unit in giving the pipe cantilever support.

31. Apparatus as recited in claim 26, including control means carried by said carriage for controlling movement of a pipe by said elevating means and by said means for moving the carriage along said track means.

32. Apparatus for moving pipes arranged essentially horizontally and essentially parallel to one another on a deck, comprising:

a carriage to be mounted movably beyond an end of said pipes;

track means located beyond said end of the pipes and mounting said carriage for movement along the track means transversely of the pipes at said end thereof;

a structure connected to said carriage for movement with the carriage along said track means and for movement relative to the carriage, and which is operable to hold one of the pipes near one end thereof and support said pipe as a cantilever;

elevating means for moving said structure and a pipe supported thereby as a cantilever upwardly and downwardly to raise the pipe from or lower it onto the deck;

means for moving said carriage and said structure and said pipe supported thereby along said track means transversely of the pipes;

said structure including a member actuable upwardly and downwardly relative to the carriage by said elevating means, and a unit for holding said pipe mounted to said member for movement relative thereto with the pipe for displacement of the pipe between a generally horizontal position and an inclined position; and an inclined conveyor for receiving a pipe supported by said unit in inclined position.

33. Apparatus for moving pipes arranged essentially horizontally and essentially parallel to one another on a deck near a well, comprising:

a carriage to be mounted movably at essentially an end of said pipes;

track means located at essentially said end of the pipes and extending transversely of the pipes and mounting said carriage for movement along the track means transversely of the pipes at said end thereof;

an arm connected to said carriage for movement with the carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck;

means for moving said carriage and said arm and said pipe supported thereby along said track means transversely of the pipes; and a conveyor positioned to receive a pipe from said arm when the carriage is at a predetermined point along said track means, and operable to advance the pipe toward said well.

34. Apparatus for moving pipes arranged essentially horizontally and essentially parallel to one another on a deck near a well, comprising:

a carriage to be mounted movably at essentially an end of said pipes;

track means located at essentially said end of the pipes and extending transversely of the pipes and mounting said carriage for movement along the track means transversely of the pipes at said end thereof;

an arm connected to said carriage for movement with the carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck;

means for moving said carriage and said arm and said pipe supported thereby along said track means transversely of the pipes; and an inclined conveyor positioned to receive a pipe from said arm when the carriage is at a predetermined point along said track means, and operable to advance the pipe along an inclined path toward said well.

35. Apparatus for moving pipes arranged essentially horizontally and essentially parallel to one another on a deck near a well, comprising:

a carriage to be mounted movably at essentially an end of said pipes;

track means located at essentially said end of the pipes and extending transversely of the pipes and mounting said carriage for movement along the track means transversely of the pipes at said end thereof;

an arm connected to said carriage for movement with the carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck;

means for moving said carriage and said arm and said pipe supported thereby along said track means transversely of the pipes;

said elevating means being operable to move said arm upwardly and downwardly relative to the carriage to raise and lower the pipe supported thereby; and a conveyor onto which said arm can lower a pipe, or from which said arm can lift a pipe, when the carriage is at a predetermined point along said track means, and which is operable to advance the pipe longitudinally toward said well or back from the well.

36. Apparatus for moving pipes arranged essentially horizontally and essentially parallel to one another on a deck near a well, comprising:

a carriage to be mounted movably at essentially an end of said pipes;

track means located at essentially said end of the pipes and extending transversely of the pipes and mounting said carriage for movement along the track means transversely of the pipes at said end thereof;

an arm connected to said carriage for movement with carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck;

means for moving said carriage and said arm and said pipe supported thereby along said track means transversely of the pipes;

said track means including two spaced parallel tracks extending transversely of said pipes beyond said end thereof;

means for applying downward force from said carriage to a first of said tracks; and means for applying upward force from said carriage to the second of said tracks to transmit cantilever support forces from said arm through said carriage to the tracks.

37. Apparatus for moving pipes arranged essentially horizontally and essentially parallel to one another on a deck near a well, comprising:

a carriage to be mounted movably at essentially an end of said pipes;

track means located at essentially said end of the pipes and extending transversely of the pipes and mounting said carriage for movement along the track means transversely of the pipes at said end thereof;

an arm connected to said carriage for movement with the carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck;

means for moving said carriage and said arm and said pipe supported thereby along said track means transversely of the pipes; and holding means carried by said arm for supporting said pipe as a cantilever and which hold said pipe near only one end thereof with the center of gravity of the pipe being beyond said holding means.

38. Apparatus for moving pipes arranged essentially horizontally and essentially parallel to one another on a deck near a well, comprising:

a carriage to be mounted movably at essentially an end of said pipes;

track means located at essentially said end of the pipes and extending transversely of the pipes and mounting said carriage for movement along the track means transversely of the pipes at said end thereof;

an arm connected to said carriage for movement with the carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck;

means for moving said carriage and said arm and said pipe supported thereby along said track means transversely of the pipes;

said track means including two spaced parallel tracks extending transversely of said pipes beyond said end thereof; and wheels on the carriage applying downward force from the carriage to both of said tracks and applying upward force from the carriage to one of the tracks.

39. Apparatus for moving pipes arranged essentially horizontally and essentially parallel to one another on a deck near a well, comprising:

a carriage to be mounted movably at essentially an end of said pipes;

track means located at essentially said end of the pipes and extending transversely of the pipes and mounting said carriage for movement along the track means transversely of the pipes at said end thereof;

an arm connected to said carriage for movement with the carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck;

means for moving said carriage and said arm and said pipe supported thereby along said track means transversely of the pipes;

said elevating means being operable to move said arm upwardly and downwardly relative to the carriage to raise and lower the pipe supported thereby;

a unit for holding said pipe mounted to said arm for movement relative thereto with the pipe in a relation moving the pipe between a generally horizontal position and an inclined position; and an inclined conveyor for receiving a pipe supported by said unit in inclined position and operable to advance a pipe toward the well.

40. Apparatus for moving pipes arranged essentially horizontally and essentially parallel to one another on a deck near a well, comprising:

a carriage to be mounted movably at essentially an end of said pipes;

track means located at essentially said end of the pipes and extending transversely of the pipes and mounting said carriage for movement along the track means transversely of the pipes at said end thereof;

an arm connected to said carriage for movement with the carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck;

means for moving said carriage and said arm and said pipe supported thereby along said track means transversely of the pipes;

a lifting unit on the arm for applying upward force to a pipe supported by the arm at a location spaced from said end of the pipe;

means on the arm for exerting downward force against the pipe at a location closer to said end thereof to coact with said lifting unit in giving the pipe cantilever support;

said lifting unit being connected to the arm for swinging movement relative thereto with the pipe for displacement of the pipe between a generally horizontal position and an inclined position; and an inclined conveyor for receiving a pipe supported by said lifting unit in inclined position.

41. Apparatus for moving pipes arranged essentially horizontally and essentially parallel to one another on a deck near a well, comprising:

a carriage to be mounted movably at essentially an end of said pipes;

track means located at essentially said end of the pipes and extending transversely of the pipes and mounting said carriage for movement along the track means transversely of the pipes at said end thereof;

an arm connected to said carriage for movement with the carriage along said track means, and which projects from the carriage as a cantilever above said pipes to an outer free end of the arm, and which is operable to support one of the pipes;

elevating means for moving a pipe supported by said arm upwardly and downwardly to raise the pipe from or lower it onto the deck;

means for moving said carriage and said arm and said pipe supported thereby along said track means transversely of the pipes said carriage forming a cabin within which an operator can be received to move transversely with the carriage relative to said pipes.

* * * * *

UNITED STATES PATENT AND TRADEMARK OFFICE
CERTIFICATE OF CORRECTION

PATENT NO. : 5,451,129
DATED : September 19, 1995
INVENTOR(S) : George I. Boyadjieff, James D. Brugman and Preston R. Fox It is certified that error appears in the above-indentified patent and that said Letters Patent is hereby corrected as shown below:

In claim 6, column 8, line 24, after "adjacent", add the following:
--a series of generally horizontal pipes on a first of the decks to move a pipe in essentially horizontal condition between said first deck and said conveyor means;
a second pipe handling machine mounted movably adjacent a series of generally horizontal pipes on the second deck to move a pipe between said conveyor means and said second deck;
said second machine being constructed to move a pipe from a generally horizontal position to an inclined position; and
additional conveyor means positioned to receive a pipe from said second machine in said inclined position and advance said pipe along an inclined path to or from the derrick.--

Signed and Sealed this

Twenty-sixth Day of December, 1995

Attest:

BRUCE LEHMAN

*Attesting Officer*  *Commissioner of Patents and Trademarks*